(12) United States Patent
Han et al.

(10) Patent No.: US 7,693,109 B2
(45) Date of Patent: Apr. 6, 2010

(54) SYSTEM AND METHOD FOR PERFORMING FAST HANDOFF IN MOBILE NETWORK

(75) Inventors: Youn-Hee Han, Guri-si (KR); Hee-Jin Jang, Yongin-si (KR); Jong-Ho Bang, Suwon-si (KR); Sung-Gi Min, Seoul (KR)

(73) Assignee: Samsung Electronics Co., Ltd. (KR)

( * ) Notice: Subject to any disclaimer, the term of this patent is extended or adjusted under 35 U.S.C. 154(b) by 136 days.

(21) Appl. No.: 11/516,551

(22) Filed: Sep. 7, 2006

(65) Prior Publication Data

US 2007/0058587 A1   Mar. 15, 2007

(30) Foreign Application Priority Data

Sep. 7, 2005   (KR) ...................... 10-2005-0083088

(51) Int. Cl.
*H04W 4/00* (2009.01)
(52) U.S. Cl. ................ 370/331; 455/436; 455/439; 370/332
(58) Field of Classification Search ................. 455/526, 455/432.1–453; 370/331, 332, 333, 334, 370/338, 349, 392
See application file for complete search history.

(56) References Cited

U.S. PATENT DOCUMENTS

| | | | |
|---|---|---|---|
| 6,438,377 B1 * | 8/2002 | Savolainen | 455/439 |
| 7,016,682 B2 * | 3/2006 | Won et al. | 455/445 |
| 7,099,283 B2 * | 8/2006 | Matta et al. | 370/252 |
| 2006/0056311 A1 * | 3/2006 | Han et al. | 370/252 |
| 2006/0176853 A1 * | 8/2006 | Liu et al. | 370/331 |

FOREIGN PATENT DOCUMENTS

KR   10-2002-0087907 A   11/2002

OTHER PUBLICATIONS

"A New Method to Support UMTS/WLAN Vertical Handover using SCTP" Li Ma, Victor C. M. Leung, The University of British Columbia. Tejinder Randhawa, British Columbia Institute of Technology.*
Li Ma et al. "A New Method to Support UMTS/WLAN Vertical Handover Using SCTP," *IEEE Wireless Communication*, Aug. 2004.

* cited by examiner

*Primary Examiner*—Nick Corsaro
*Assistant Examiner*—Babar Sarwar
(74) *Attorney, Agent, or Firm*—NSIP Law (57) ABSTRACT

A mobile network is disclosed in which there exists a Mobile Node (MN), the MN is managed by a first Access Router (AR), and there exists a second AR with a subnet different from the first AR. A method is provided for the MN performing a fast handoff from the first AR to the second AR, which includes receiving a Routing Advertisement (RA) message of the second AR from the first AR, generating an IP address to be used in the second AR using the RA message of the second AR if the MN recognizes that it should perform a handoff from the first AR to the second AR, performing a trigger for using the generated IP address if the movement to the second AR is completed, and transmitting/receiving a Correspondent Node (CN) and data using the IP address.

12 Claims, 10 Drawing Sheets

SYSTEM AND METHOD FOR PERFORMING FAST HANDOFF IN MOBILE NETWORK

PRIORITY

This application claims the benefit under 35 U.S.C. §119(a) of Korean Patent Application No. 2005-83088, filed Sep. 7, 2005, in the Korean Intellectual Property Office, the entire contents of which are hereby incorporated by reference.

BACKGROUND OF THE INVENTION

1. Field of the Invention

The present invention relates to a mobile network. More particularly, the present invention relates to a system and a method for performing a fast handoff in a mobile network using a mobile Stream Control Transmission Protocol ("mSCTP").

2. Description of the Related Art

Currently, an Internet Protocol ("IP") network, that is, an Internet network, and a wired interval in a cellular network has been simultaneously developed. Further, terminals operating within only a wired environment are also required to provide services while maintaining seamless connection in a fast wireless environment.

Because only a wireless environment is considered in the existing Internet environment, an IP address is allocated to a terminal only once. However, problems can arise where a connection is maintained through the allocated IP address and the terminal moves. This situation is exacerbated when a terminal using an IP address through which data is transmitted moves to another location and is also used in a wired interval of a mobile network environment where not only a voice communication function is available, but also a data communication function is added to the functionality of the terminal.

To solve the aforementioned problem, the Internet Engineering Task Force ("IETF") has suggested a protocol called Mobile IP ("MIP") for supporting the mobility of a terminal in a network layer. If the mobility of a terminal is supported in the network layer, a session can be maintained in a transport layer without recognizing the movement of the terminal. However, entities such as a home agent or a foreign agent should exist so as to support mobility in the network layer. The existence of such entities creates a problem in terms of overhead and inefficiency.

To address these concerns, mSCTP has been suggested as a new mobility support plan. The mSCTP is a protocol in which mobility is added to SCTP in an IETF working group. Although the SCTP was suggested as a transmission layer protocol for signal transmission, the SCTP has been currently specified as a conventional transport layer standard protocol for an IP network together with User Datagram Protocol (UDP) and Transmission Control Protocol (TCP). The SCTP is a connection-based transport protocol, similar to TCP, in which terminals located at two end-points establish a connection for communication performance. The connection is referred to as an association.

Further, the SCTP has multi-streaming and multi-homing characteristics. The multi-streaming divides data into a plurality of streams, and each of the divided streams is transmitted in accordance with the corresponding characteristic; multi-homing permits a host to have several EP addresses. Accordingly, TCP uses a combination of transmitter address, transmitter port number, recipient address and recipient port number to identify the connection, while SCTP identifies the association with transmitter IP address group, transmitter port number, recipient IP address group and recipient port number. Such multi-homing support can more flexibly cope with network defects, and provide a higher level of reliability than with an IP layer.

Figure 1A:
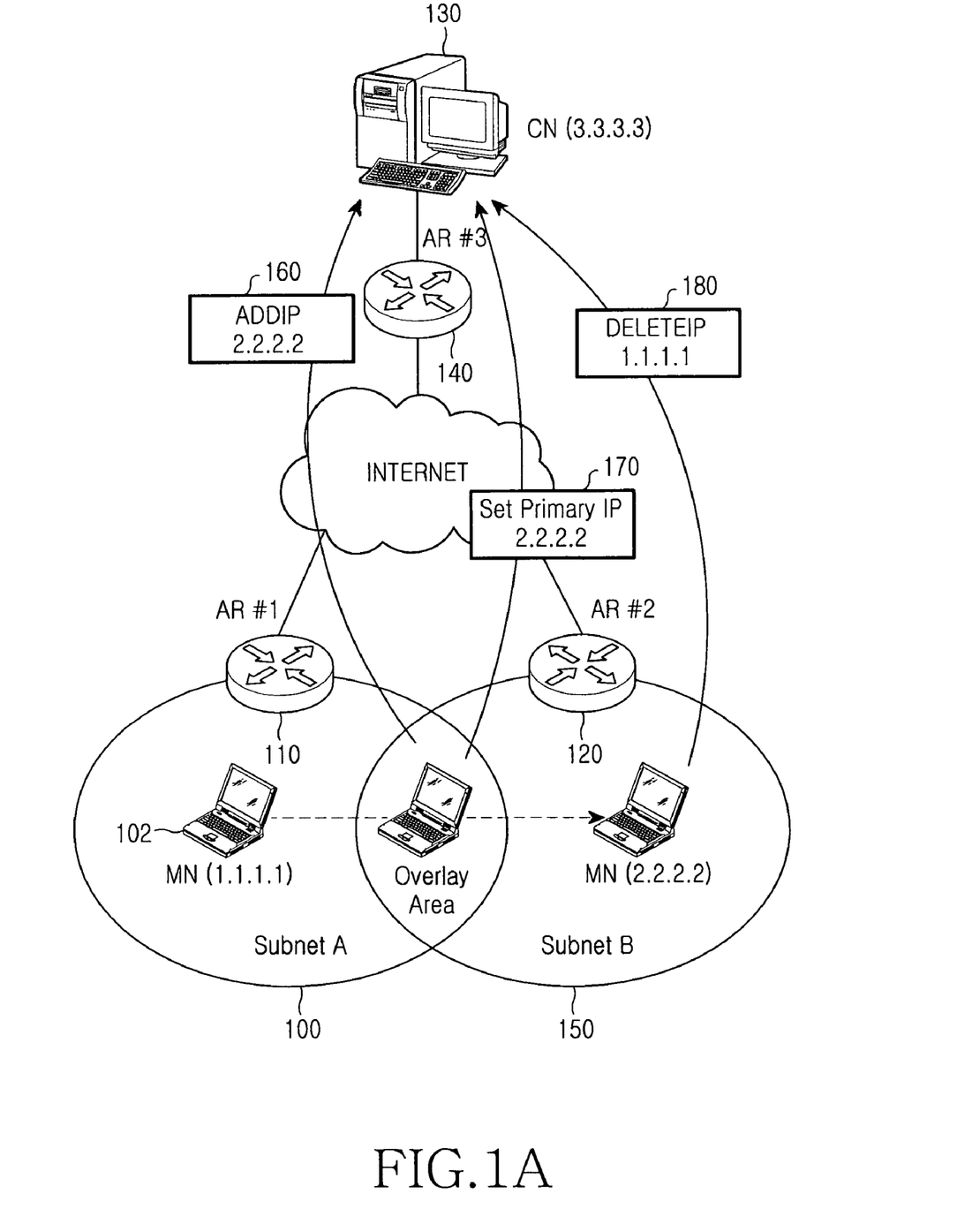
FIGS. 1A and 1B are network configuration views illustrating an operational process of mSCTP in a general mobile network.
Figure 1B:
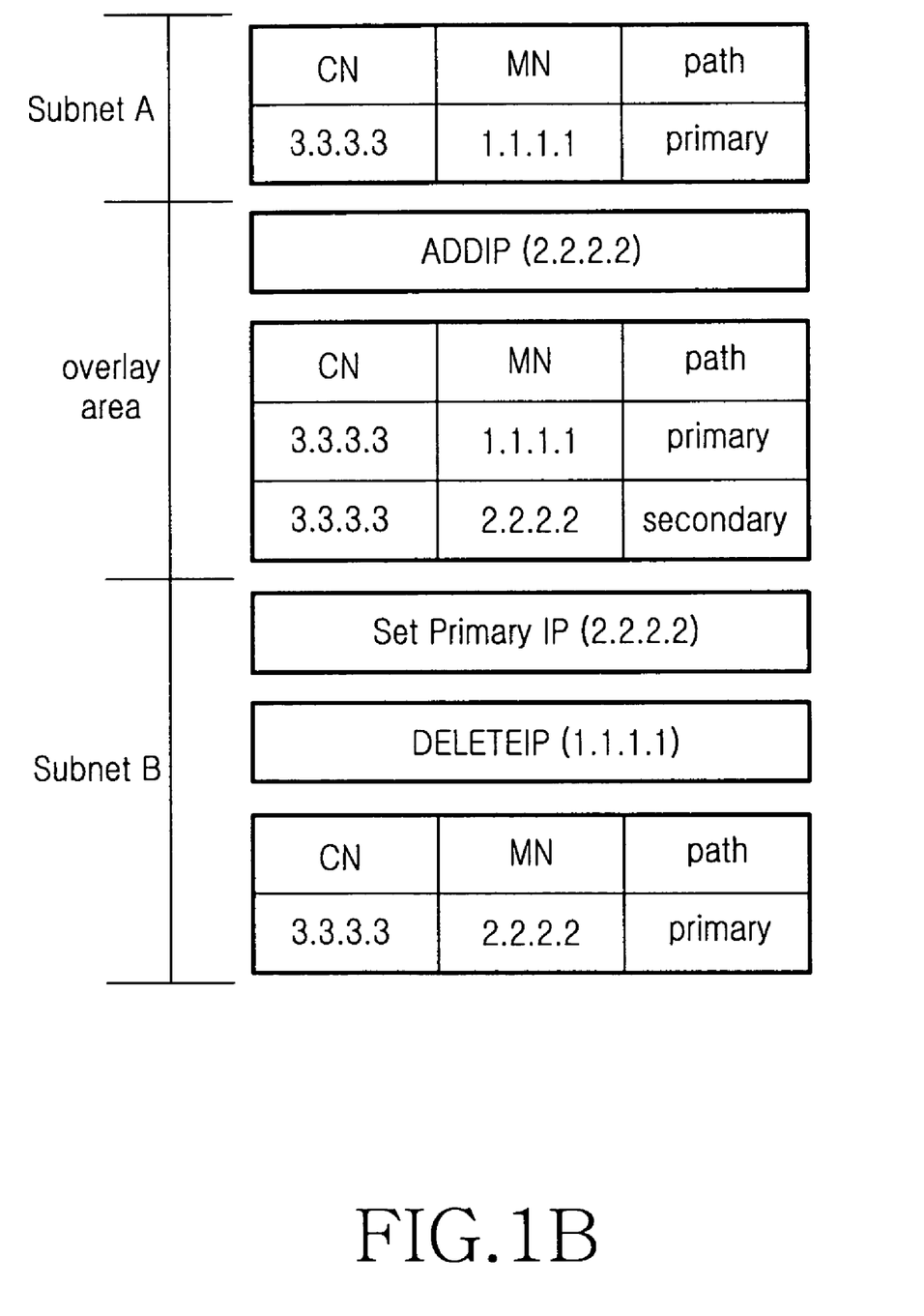

FIGS. 1A and 1B are network configuration views illustrating an operational process of mSCTP in a general mobile network.

Referring to FIGS. 1A and 1B, a Mobile Node ("MN") 102 using mSCTP is located in an area 100 corresponding to subnet A that is within the jurisdictional area of Access Router ("AR") #1 110. MN 102 uses IP address [1.1.1.1], and a Corresponding Node ("CN") 130 with IP address [3.3.3.3], which is controlled by AR #3 140, recognizes the IP address of MN 102. Thereafter, the MN 102 may move to an overlay area where subnet A 100 and subnet B 150, controlled by AR #2 120, are overlapped with each other. Accordingly, the MN 102 adds a new IP address [2.2.2.2] (160) corresponding to subnet B 150. The MN 102 informs the CN 130 of the added IP address, the CN 130 then recognizes the newly added address. The MN 102 determines the presence of an addition of the new IP address through a process of comparing a preset critical value with reception signal intensity.

The MN 102 located in the overlay area uses the previous IP address, IP address [1.1.1.1], as the primary IP address, and the newly added IP address, IP address [2.2.2.2], as a secondary IP address. That is, the MN 102 using the mSCTP uses only the primary IP address to perform data transmission/reception, and the secondary IP address is used for data retransmission and backup.

When the MN 102 moves closer to the area of subnet B 150, the primary IP address is changed to [2.2.2.2] through comparison between a critical value and reception signal intensity. The MN 102 informs the CN 130 of the changed primary IP address (170), and the CN 130 recognizes the primary IP address of the MN 102. Further, after the MN 102 has completed the primary IP address change, IP address [1.1.1.1] is deleted (180) in the previous subnet (A), and CN 130 is informed of this completion.

Figure 2:
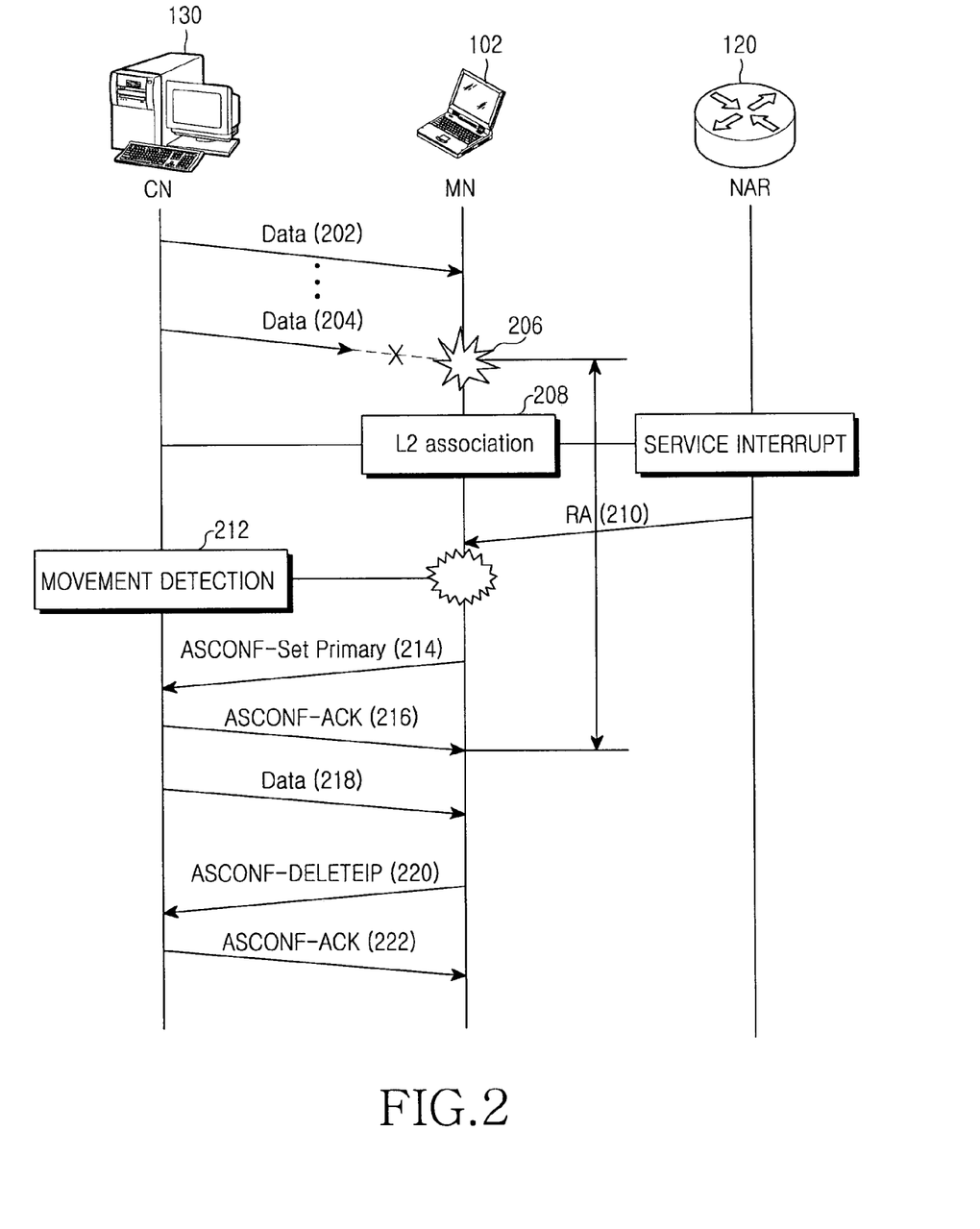
FIG. 2 is a signal flow diagram illustrating an operational process in accordance with an MN handoff in a conventional mobile network.

FIG. 2 is a signal flow diagram illustrating an operational process in accordance with a handoff of MN in a conventional mobile network.

Referring to FIG. 2, MN 102 receives data from CN 130 (step 202). Thereafter, the MN 102 may move from a network in which data reception is currently possible to another network with a different subnet address. In this case, the MN 102 cannot receive data (204) transmitted from the CN 130 from a certain time point (step 206). The MN 102 completes a call setting through an Access Point ("AP") and an L2 association of the newly moved network (step 208).

Thereafter, the MN 102 receives a Router Advertisement ("RA") message periodically broadcasted from the AR 120 of the newly moved network, that is, New AR ("NAR") 120 (step 210). As the RA message is received, the MN 102 recognizes that the MN 102 itself has moved to the network using another subnet (step 212). The RA message contains 64-bit prefix information of the NAR 120.

Thus, the MN 102 obtains a new IP address from the NAR 120, and transmits an AddresS CONFiguration Change (ADDIP ASCONF) signal to the CN 130 to inform of the newly obtained address. Further, the MN 102 transmits an ASCONF-SetPrimary signal to the CN 130 to inform that the primary IP address has been changed (Step 214). The CN 130 obtains the IP address of the MN 102, and adds a corresponding mSCTP association when receiving the AddresS CONFiguration Change (ADDIP ASCONF) signal. Further, the CN 130 transmits an ASCONF-ACK signal (step 216)

informing MN 102 that the primary IP address has been changed when receiving the ASCONF-SetPrimary signal (step 214).

Having received the ASCONF-ACK signal, the MN 102 can receive data transmitted from the CN 130 for the first time (step 218). Meanwhile, if it is recognized that the previous AR and IP address are no longer required, the MN 102 transmits an ASCONF-DELETEIP signal to the CN 130 to delete the IP address (step 220). The CN 130 deletes the previous IP address from a corresponding SCTP association address list, and changes the primary IP address of the corresponding SCTP association into the IP address of a new subnet. The CN 130 then transmits an ASCONF-ACK signal to the MN 102 informing that the previous IP address has been deleted (step 222).

As described above, the MN 102 cannot receive data transmitted from the CN 130 during the period of step 206 to step 216 in accordance with a handoff of the MN 102.

Figure 3:
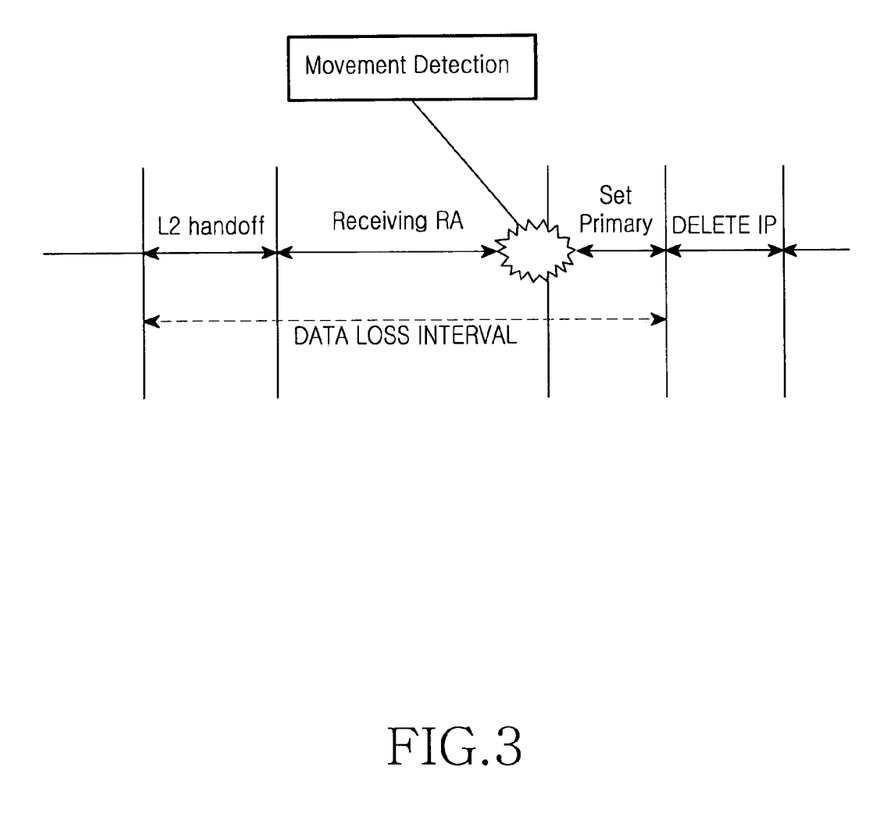
FIG. 3 is a view illustrating a data processing delay time flow in accordance with an MN handoff in a conventional mobile network.

FIG. 3 is a view illustrating a data processing delay time flow in accordance with an MN handoff in a conventional mobile network.

Referring to FIG. 3, the MN cannot receive data transmitted from the CN during the time of an L2 handoff corresponding to the AP change, a time when the RA message is received from the AR of the moved network, or a time when the primary IP address is changed. The L2 handoff delay time, for example, occurs for 100 msec to 1 sec, and the RA message reception delay time, for example, occurs for 1 to 10 sec. Thus, a delay time in accordance with a handoff of the MN using mSCTP occupies most of the time delay until the RA message is received.

Although the mSCTP supports handoff as described above, the MN using mSCTP cannot receive data due to the occurrence of delay time during handoff. Particularly, when there is a ping-pong handoff in which the MN changes different subnets at any time, the delay occurrence caused by the handoff creates a large overhead. Accordingly, there is an urgent need for a solution employing a fast handoff in a next-generation mobile communication system that aims at seamless connection in a fast radio environment.

SUMMARY OF THE INVENTION

Accordingly, exemplary embodiments of the present invention have been made to address the above-mentioned problems occurring in the prior art, and it is therefore an object of exemplary embodiments of the present invention to provide a system and method for supporting a fast handoff in a mobile network.

In order to accomplish these and other objects, exemplary embodiments of the present invention, provide a method for performing fast handoff of a Mobile Node (MN) from a first Access Router (AR) to a second AR in a mobile network in which there exists the MN, wherein the MN being managed by the first AR, and there exists a second AR with a subnet different from the first AR. The method includes receiving a Routing Advertisement (RA) message of the second AR from the first AR, generating an IP address to be used in the second AR using the RA message of the second AR if the MN recognizes that it should perform a handoff from the first AR to the second AR, performing a trigger for using the IP address generated if the movement to the second AR is completed, and transmitting/receiving a Corresponding Node (CN) and data using the IP address.

Exemplary embodiments of the present invention provide a system for performing a fast handoff in a mobile network. The system includes an MN located in an arbitrary AR to receive an RA message of an adjacent AR from the arbitrary AR, to generate an IP address to be used in the adjacent AR using the received RA message of the adjacent AR if the MN recognizes that it should perform a handoff from the arbitrary AR to the adjacent AR, to perform a trigger for using the generated IP address if the movement to the adjacent AR is completed, and to transmit/receive a CN and data using the IP address.

BRIEF DESCRIPTION OF THE DRAWINGS

The above and other objects, exemplary features and advantages of the present invention will become more apparent from the following detailed description of certain exemplary embodiments thereof when taken in conjunction with the accompanying drawings, in which.

Throughout the drawings, like reference numbers should be understood to refer to like elements, features, and structures.

DETAILED DESCRIPTION OF THE PREFERRED EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Exemplary embodiments of the present invention provide a system and method for supporting a fast handoff of a Mobile Node (hereinafter, referred to as "MN") while linking with a Fast handoff over Mobile Internet Protocol ("FMIP") in a mobile network using a mobile Stream Control Transmission Protocol ("mSCTP").

Exemplary embodiments of the present invention further provide a fast MN handoff that is supported using a cache of an Access Router ("AR"), wherein the MN uses a dual interface for fast handoff support, except the method of linking the mSCTP with the FMIP.

Mobile IP ("MIP") comprises a protocol for allowing a connection of Mobile Node ("MN") that does not disconnect even under movement. The MN informs its own Home Agent (HA) and Corresponding Node (CN) of the current MN location through Binding Update (BU) whenever the MN changes a subnet while moving so that connection is maintained.

As described above, the problem of the MIP is that the MN loses connection with the CN before registration from the previous subnet to a new subnet is completed, which results in data loss and delay. Such packet loss and delay is not suitable for real-time communications. In order to address such a problem, exemplary embodiments provide an FMIP. The FMIP can performs an L3 handoff through an Access Router ("AR") of the previous subnet, and signaling between ARs of a new subnet.

Figure 4:
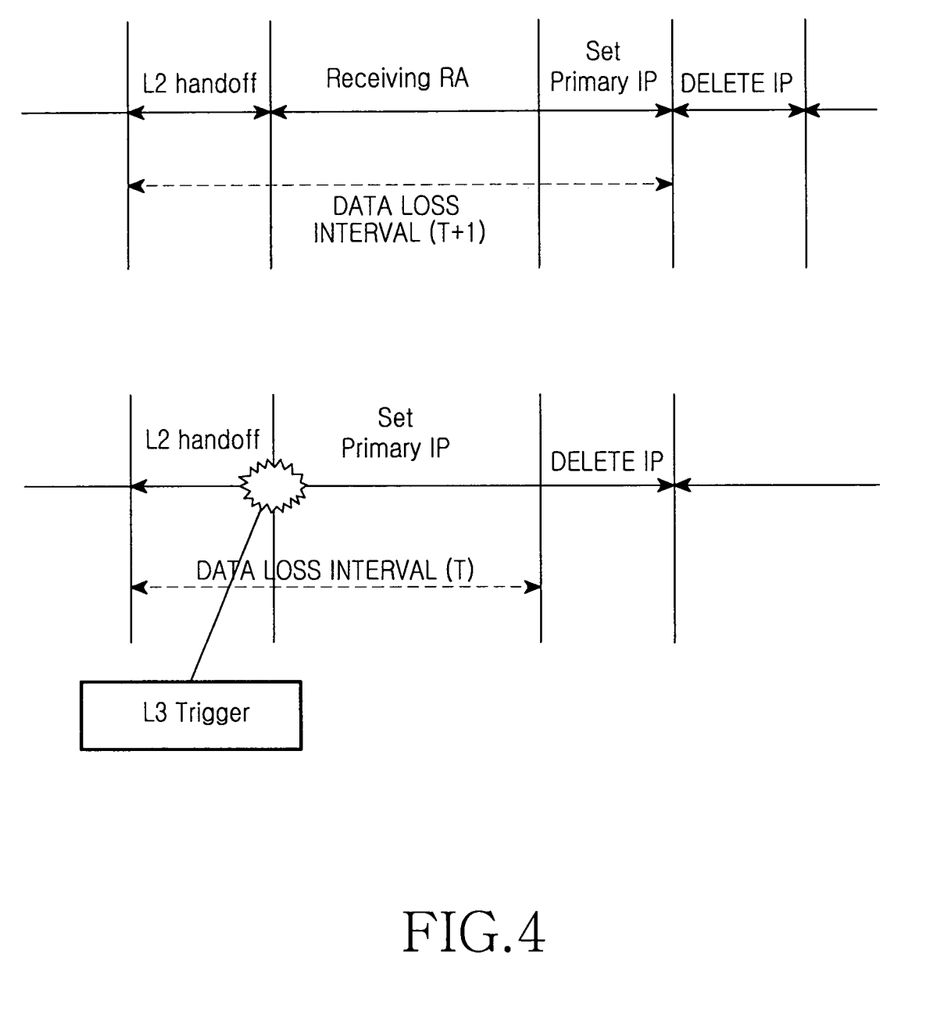
FIG. 4 is a view illustrating an improved data processing delay time flow in accordance with an MN handoff in a mobile network according to an exemplary embodiment of the present invention.

FIG. 4 is a view illustrating improved data processing delay time flow in accordance with an MN handoff in a mobile network according to an exemplary embodiment of the present invention.

Referring to FIG. 4, when the MN performs a handoff as in FIG. 3, the MN cannot receive data input from the CN during an L2 handoff time corresponding to an AP change, a time for receiving an RA message from the AR of a moved network, or a time for changing a primary IP address. Assuming, per conventional arts, that the total time during which the MN cannot receive data is t+1, since the MN according to exemplary embodiments of the present invention has previously received an RA message in which subnet information of the moved network is contained before performing a handoff, and previously configured an EP address to be used in the handoff in accordance with an IP address auto-configuration procedure, the time taken until the MN can receive data becomes t. In the IP address auto-configuration, a total 128-bit IP address is configured through a combination of a 64-bit prefix contained in the RA message and a 64-bit MN interface ID.

Meanwhile, in an exemplary implementation, "L3 trigger" is defined to support a fast MN handoff. The L3 trigger occurs to perform a procedure for use as an IP address corresponding to a new subnet in which the IP address having been previously auto-configured is handed off. This will be further described later with reference to the accompanying drawings.

Figure 5:
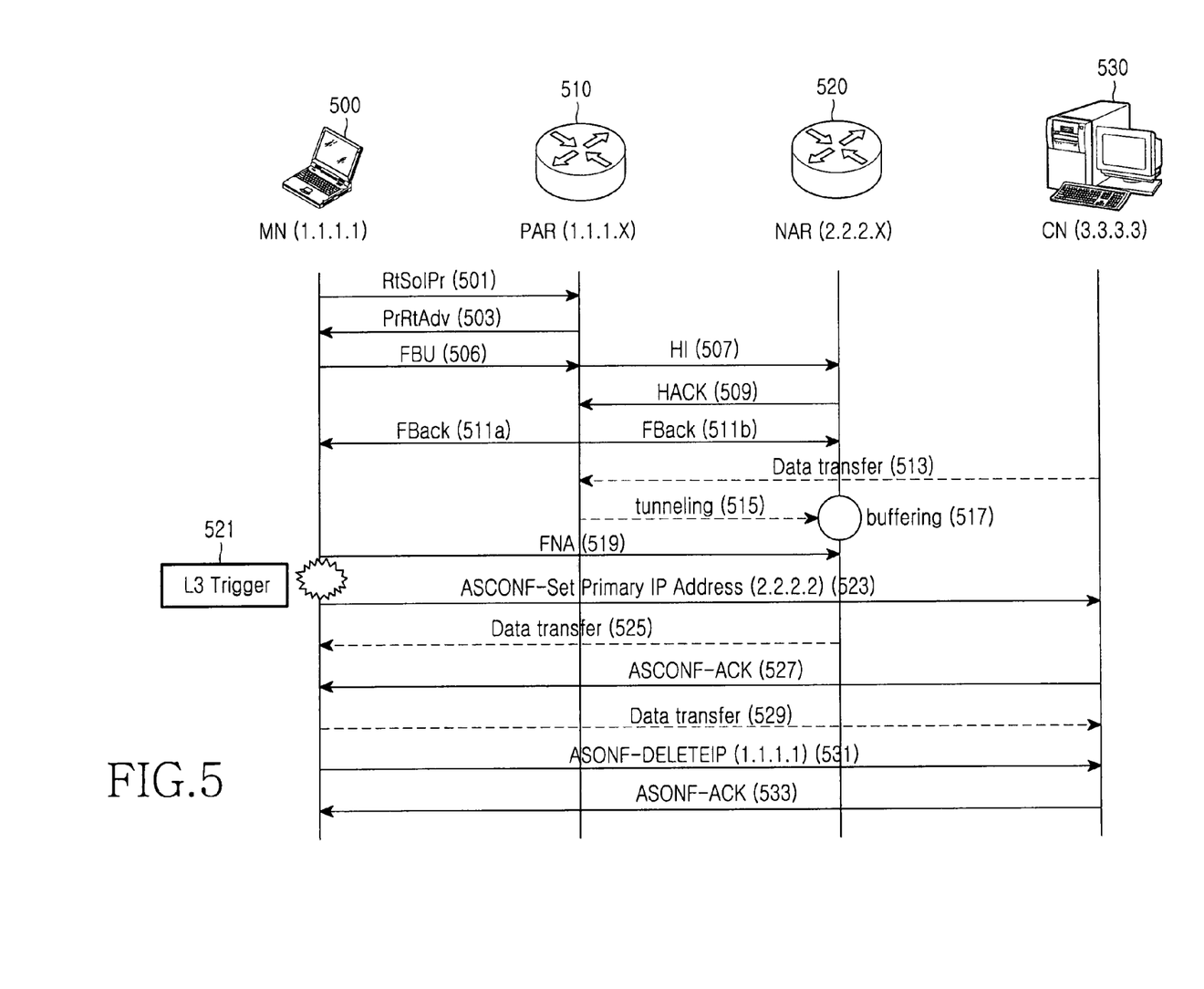
FIG. 5 is a signal flow diagram illustrating an operational process when performing a fast MN handoff in accordance with an FMIP link in the mobile network according to an exemplary embodiment of the present invention.

FIG. 5 is a signal flow diagram illustrating an operational process when performing a fast MN handoff in accordance with an FMIP link in the mobile network according to an exemplary embodiment of the present invention.

Referring to FIG. 5, MN 500 has IP address [1.1.1.1], and is located in a lower rank of the Previous AR ("PAR") 510. If reception signal intensity falls below a critical value, or the signal intensity received from PAR 510 falls below the signal intensity received from NAR, the MN 500 transmits a Router Solicitation for Proxy ("RtSolPr") message requesting surrounding AR information to the PAR 510 (step 501). If the RtSolPr message of the MN 500 is received, the PAR 510 transmits a Proxy Router Advertisement ("PrRtAdv") message containing surrounding AR or Access Point (AP) information to the MN 500 (step 503). The MN 500 having received the PrRtAdv message can obtain subnet IP address information of the surrounding AR, and obtain an IP address corresponding to a subnet IP address to be handed off in accordance with the IP address auto-configuration procedure if it is determined that a handoff should be performed. Although the PrRtAdv is similar to a general RA message, it comprises a message in which the RA message is periodically broadcasted, whereas the PrRtAdv message is transmitted only in a case where the RtSolPr message is received from the MN.

If the MN 500 recognizes that a handoff to a surrounding New AR ("NAR") should be performed, it transmits a Fast Binding Update ("FBU") message to the PAR 510 (step 506). The PAR 510 having received the FBU, transmits a Handoff Initiate ("HI") message to the NAR 520 (step 507). The NAR 520 transmits a Handoff ACKnowledge (HACK) message to the PAR 510 in response to the HI message (step 509). The PAR 510 transmits a Fast Binding acknowledge (FBack) message to the MN 500 (step 511a) and the NAR 520 (step 511b).

If there exists data to be transmitted to the MN 500, the Corresponding Node ("CN") 530 transmits data to the PAR 510 (step 513). As the MN 500 recognizes that it will perform a handoff to the NAR 520, the PAR 510 transmits data to be received by the MN 500 to the NAR 520 (step 515). The NAR 520 buffers the data received from the PAR 510 (step 517). The MN 500 completes the movement to the NAR 520, and transmits a Fast Neighbor Advertisement ("FNA") message to the NAR 520 (step 519).

The MN 500 having completed the FNA message transmission performs an L3 trigger to more rapidly set the IP address having been previously configured through the auto-configuration as a primary IP address (step 521). The L3 trigger is a kind of indication informing what event has occurred from a network layer (Layer 3) of the MN 500 to a transport layer (Layer 4) performing mSCTP. The MN 500 having performed the L3 trigger performs an AddresS CONFiguration Change (ASCONF)—Set Primary IP address procedure of setting the primary IP address as the previously configured IP address. Here, it is assumed that the IP address having been previously configured by the MN 500 through the auto-configuration is [2.2.2.2]. That is, the MN 500 sets IP address [2.2.2.2] as a primary IP address, and informs of the primary IP address set as the CN 530 (step 523).

The NAR 520 then transmits the buffered data to the MN 500 (step 525), and the CN 530 transmits the ASCONF-ACK message that is a response message for primary IP address setting information to the MN 500 (step 527). If data is available to be transmitted to the CN 530, the MN 500, having received the ASCONF-ACK, may transmit the data to the CN 530 using the set primary IP address (step 529). Further, the MN 500 deletes the previous IP address used in performing communications with the PAR 510, that is, IP address [1.1.1.1], and transmits an ASCONF-DELETEIP message to inform the CN 530 (step 531). The CN 530 transmits the ASCONF-ACK message to the MN 500, which is a response message in accordance with the IP address deletion, and deletes [1.1.1.1], which is the IP address of the MN 500, from an IP address management list (step 533).

In an exemplary implementation, as a method of previously receiving an RA message from an object network to be handed off so as to minimize data reception delay, the MN comprises a built-in dual interface, which will be described with reference to FIG. 6, and a router maintains an RA cache, which will be described with reference to FIGS. 7A and 7B.

Figure 6:
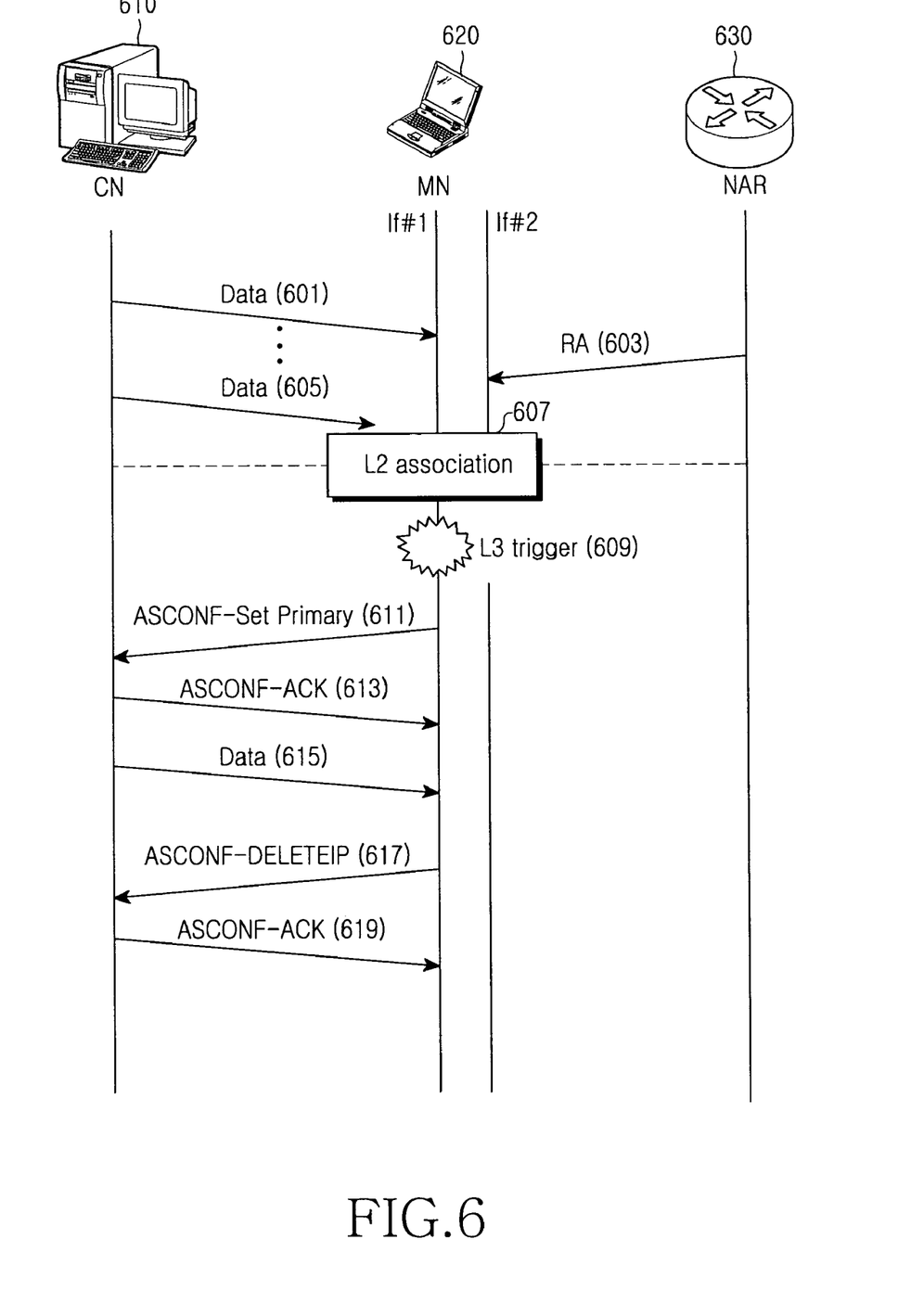
FIG. 6 is a signal flow diagram illustrating a process of performing a fast MN handoff with a built-in dual interface in the mobile network according to an exemplary embodiment of the present invention.

FIG. 6 is a signal flow diagram illustrating a process of performing a fast MN handoff with a built-in dual interface in the mobile network according to an exemplary embodiment of the present invention.

Referring to FIG. 6, the MN 620 has built-in communication interface If#1 of PAR (not shown) using an arbitrary subnet IP address and built in communication interface If#2 of NAR 630 using a subnet IP address different from the PAR together. Thus, the MN 620 can receive an RA message from the NAR 630 through interface If#2, even while receiving data from the CN 610 using communication interface If#1 of the PAR (steps 601 and 605). When the MN 620 performs a handoff from the PAR to the NAR 630, the MN 620 can perform an L2 association using the previously received RA message of the NAR 630 (step 607), and then perform an L3 trigger according to exemplary embodiments of the present invention (step 609) so that it can perform a series of operations at high speed (steps 611 to 619).

Figure 7A:
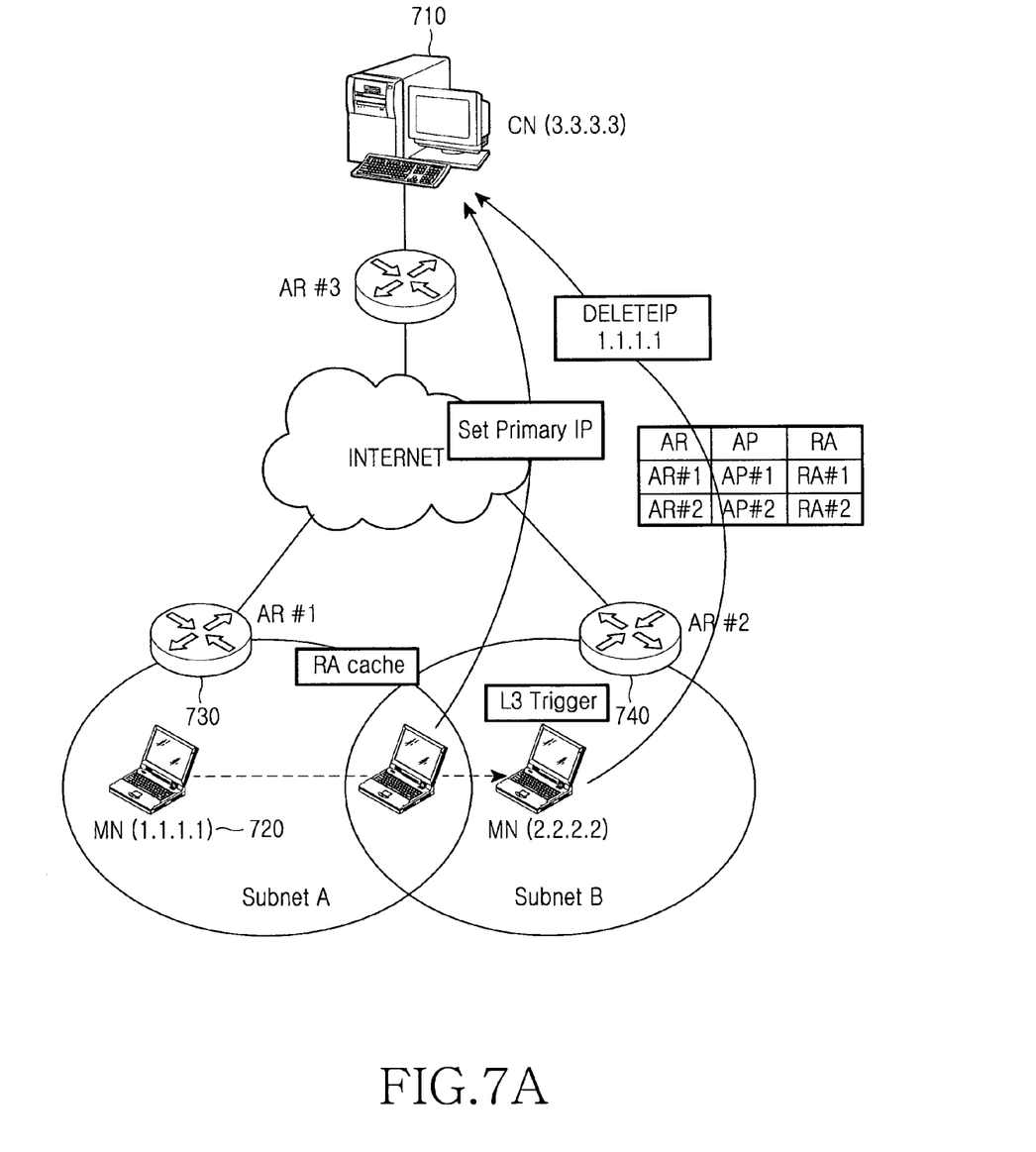
FIGS. 7A and 7B are views illustrating an operation of performing a fast handoff using an RA cache maintained by a router in the mobile network according to an exemplary embodiment of the present invention.
Figure 7B:
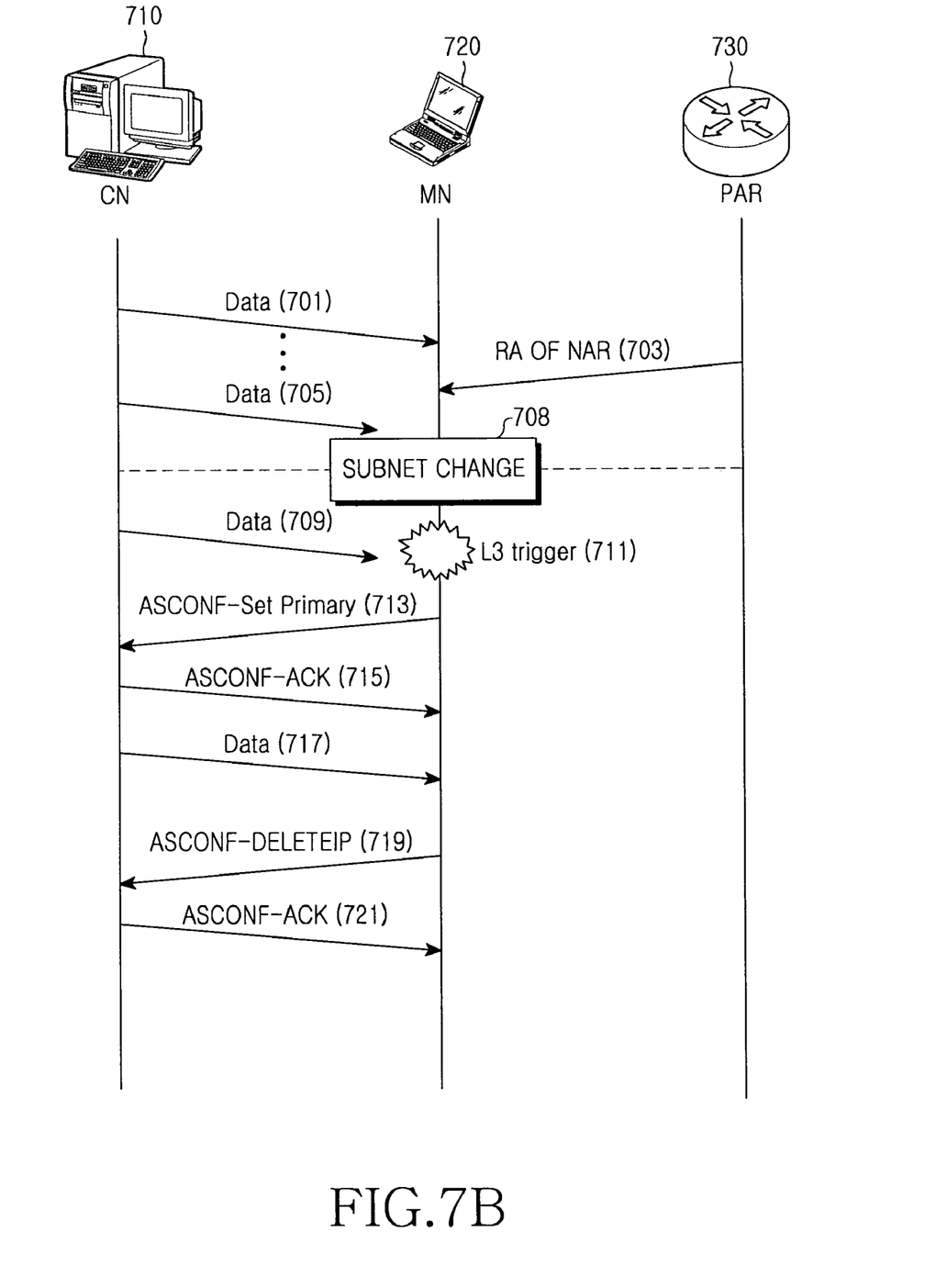

FIGS. 7A and 7B are views illustrating an operation of performing a fast handoff using an RA cache maintained by a router in the mobile network according to the embodiment of the present invention.

Referring to FIG. 7A, MN 720 is located in subnet A that is within the jurisdictional area of AR #1 730. The MN 720 uses IP address [1.1.1.1], and previously receives an RA message of AR #2 740, which will be handed off from the AR #1 730. The AR #1 730 receives the RA message of the AR #2 740 through a backbone network, stores it in a cache memory, and transmits the RA messages of the AR #1 730 and AR #2 740 together when the RA message should be transmitted to the MN 720.

If the MN 720, having received the RA messages of the AR #1 730 and AR #2 740, recognizes that it should perform a handoff, it generates an IP address to be used in the AR #2 740, that is, IP address [2.2.2.2], through an IP address auto-configuration procedure. Thereafter, the MN 720 may move into an overlay area that is within the jurisdictional area where subnet A and subnet B controlled by the AR #2 740 are overlapped with each other. Accordingly, the MN 720 adds the generated IP address, that is, [2.2.2.2]. The MN 720 informs the CN 710 of the added IP address, and the CN 710 recognizes the address newly added by the MN 720 (Set Primary IP).

The MN 720 located in the overlay area uses the previous IP address, IP address [1.1.1.1], as a primary IP address, and uses the newly added IP address, IP address [2.2.2.2], as a secondary IP address. If the MN 720 completely moves to the area of subnet B, it changes previously auto-configured IP address [2.2.2.2] into the primary IP address through the L3 trigger. The MN 720 informs the CN 710 of the changed primary IP address, and the CN 710 recognizes the primary IP address of the MN 720. Further, the MN 720, having completed the primary IP address change, deletes the previous IP address [1.1.1.1] in subnet A, after which data transmission becomes impossible, and informs the CN 710 (DELETEIP 1.1.1.1).

Next, referring to FIG. 7B, the MN 720 receives data from the CN 710 (steps 701 and 705). Further, the MN 720 has previously received an RA message of the NAR (not shown) from the PAR 730 (step 703). The MN 720, having received the RA message of the NAR, can generate an IP address corresponding to a subnet to be handed off through the IP address auto-configuration procedure. When the MN 720 changes subnet from the PAR 730 to the NAR while moving (step 708), the MN 720 cannot receive normal data from the CN 710 (step 709). Thus, the MN 720 performs the L3 trigger (step 711) so that it can rapidly transmit the ASCONF-Set Primary message to the CN 710 (step 713) for changing the newly generated IP address into the primary IP address.

The MN 720 receives an ASCONF-ACK message from the CN 710 in response to the IP address change information (step 715). Thereafter, the MN 720 can receive data from the CN 710 (step 717), and transmit an ASCONF-DELETEIP message to the CN 710 to delete the previous primary IP address used when having been previously located in the area of the PAR 730 (step 719). The MN 720 receives an ASCONF-ACK message in response to the ASCONF-DELETEIP message (step 721).

Figure 8:
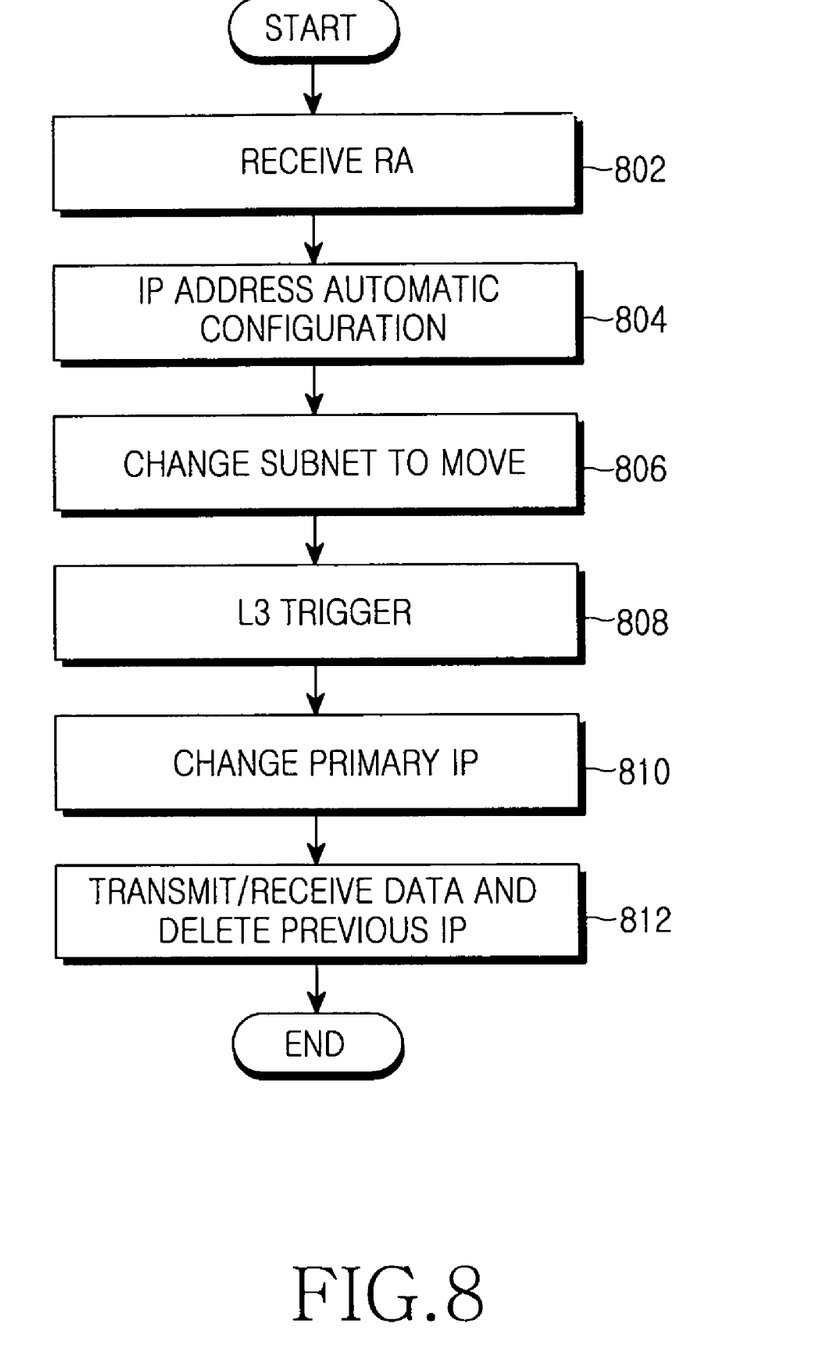
FIG. 8 is a flowchart illustrating a process of performing a fast MN handoff in the mobile network according to an exemplary embodiment of the present invention.

FIG. 8 is a flowchart illustrating a process of performing a fast MN handoff in the mobile network according to an exemplary embodiment of the present invention.

Referring to FIG. 8, the MN previously receives an RA message of the NAR in the subnet area to be handed off from the PAR of the currently located subnet area at step 802, and proceeds to step 804. The MN generates an IP address to be used in the subnet area to be previously handed off before the hand off is performed through the IP address auto-configuration method at step 804, and proceeds to step 806. The MN moves to an NAR area using a subnet IP address different from the currently located PAR at step 806, and proceeds to step 808. The MN performs the L3 trigger so as to change an IP address to be used in the NAR area at step 808, and proceeds to step 810. The MN changes a primary IP to be used in the NAR area into the new IP address previously generated at step 810, and proceeds to step 812. The MN performs the operation of transmitting/receiving data from other nodes, and deleting the primary IP address having been previously used at step 812.

As described above, exemplary embodiments of the present invention have an advantage in that the MN previously receives an RA message of another subnet area in which the MN is to be handed off, and using an IP auto-configuration method, previously generates a new IP address in a mobile network so that an IP address change is possible at high speed when the MN performs a handoff. Accordingly, there is an advantage in that the MN performs a seamless handoff so that communication interruption time can be minimized.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims and equivalents thereof.

What is claimed is:

1. A method of a Mobile Node (MN) performing a fast handoff from a first Access Router (AR) to a second AR in a mobile network in which there exists an MN, the MN is managed by the first AR, and there exists the second AR with a subnet different from the first AR, comprising the steps of:
   receiving a Routing Advertisement (RA) message of the second AR from the first AR;
   generating an IP address to be used in the second AR using the RA message of the second AR if the MN recognizes that it should perform a handoff from the first AR to the second AR;
   generating an L3 trigger for using the generated IP address if the movement to the second AR is completed;
   transmitting/receiving data with a Correspondent Node (CN) using the generated IP address; and
   changing the generated IP address into a primary IP address from a network layer (Layer 3) to a transport layer (Layer 4) of the MN in response to the L3 trigger, said L3 trigger being generated to perform a procedure to use the generated IP address as an IP address corresponding to a new subnet.

2. The method as claimed in claim 1, wherein, in a case where signal intensity received from the first AR is below a preset critical value, the MN recognizes that it should perform a handoff to the second AR.

3. The method as claimed in claim 1, wherein, in a case where signal intensity received from the first AR is below signal intensity received from the second AR, the MN recognizes that it should perform a handoff to the second AR.

4. The method as claimed in claim 1, wherein the IP address to be used in the second AR is generated using an address auto-configuration method of mobile IP version 6(MIPv6).

5. The method as claimed in claim 1, further comprising a step of changing the IP address used in the first AR into an IP address to be used in the second AR, and then deleting the IP address used in the first AR when the MN has completed the movement to the second AR.

6. The method as claimed in claim 1, wherein the RA message of the second AR contains prefix information of the second AR.

7. A system to perform a fast handoff in a mobile network, the system comprising; an arbitrary Access Router (AR); an adjacent AR to send a Router Advertisement (RA); a Mobile Node (MN) located in the arbitrary Access Router (AR) to receive the (RA) message of the adjacent AR from the arbitrary AR, to generate an IP address to be used in the adjacent AR using the received RA message of the adjacent AR if the MN recognizes that it should perform a handoff from the arbitrary AR to the adjacent AR, to generate an L3 trigger for using the generated IP address if the movement to the adjacent AR is completed, to transmit/receive data with a Correspondent Node CN using the generated IP address, and to change the generated IP address into a primary IP address from a network layer (Layer 3) to a transport layer (Layer 4) of the MN in response to the L3 trigger, said L3 trigger being generated to perform a procedure to use the generated IP address as an IP address corresponding to a new subnet.

8. The system as claimed in claim 7, wherein, in a case where signal intensity received from the arbitrary AR is below a preset critical value, the MN recognizes that it should perform a handoff to the adjacent AR.

9. The system as claimed in claim 7, wherein, in a case where signal intensity received from the arbitrary AR is below signal intensity received from the adjacent AR, the MN recognizes that it should perform a handoff to the adjacent AR.

10. The system as claimed in claim 7, wherein the IP address to be used in the second AR is generated using an address auto-configuration method of mobile IP version 6(MIPv6).

11. The system as claimed in claim 7, wherein the IP address used in the arbitrary AR is changed into an IP address to be used in the adjacent AR, and then the IP address used in the arbitrary AR is deleted when the MN has completed the movement to the adjacent AR.

12. The system as claimed in claim 7, wherein the arbitrary AR transmits an RA message containing prefix information of the adjacent AR.

* * * * *